United States Patent [19]

Deng

[11] Patent Number: 5,230,166
[45] Date of Patent: Jul. 27, 1993

[54] AIR DRIER

[76] Inventor: Gwo-Jen Deng, 5th Floor, No. 7, Lane 402, Chung Kang Rd., Hsin Chuang City, Taipei Hsien, Taiwan

[21] Appl. No.: 915,671

[22] Filed: Jul. 21, 1992

[51] Int. Cl.$^5$ ............................................. F26B 21/06
[52] U.S. Cl. ......................................... 34/74; 34/82; 34/76; 62/93; 55/269; 165/111
[58] Field of Search ................... 34/72, 73, 76, 82, 74, 34/58; 62/90, 93, 271; 55/269, 456, 457; 165/111

[56] References Cited

U.S. PATENT DOCUMENTS

| 2,783,616 | 3/1957 | Dodge | 62/90 |
| 3,818,718 | 6/1974 | Freese | 62/90 |
| 4,242,110 | 12/1980 | Hynes | 55/269 |
| 4,471,836 | 9/1984 | Hokanson | 55/269 |
| 4,497,182 | 2/1985 | Youngworth | 62/93 |

*Primary Examiner*—Henry A. Bennet
*Assistant Examiner*—Denise L. Gromada
*Attorney, Agent, or Firm*—Bacon & Thomas

[57] ABSTRACT

An improved air drier adapted for drying humid air is equipped with a cylinder shaped shell having a conical water collecting bottom and a duct disposed therein which is provided with an air outlet tube through the center thereof; and the outer wall of the duct helically wound with the elongated condensing tube in which the coolant of a condenser circulates is helically disposed a continuous partition board in correspondence to the wound condensing tube; the periphery of the continuous partition board is not in contact with the inner wall of the cylinder shaped shell with a drain space defined therebetween so as to permit the water condensed from the moisture in the humid air can drip down therefrom to the water collection bottom. The dried air is then led through the outlet tube to the outside. The present air drier is characterized in that humid air is pumped into the cylinder shaped shell by a pump and further led through the helically wound partition baord at such a speed whereby moisture particles and other dirt particles can whirl therethrough and collide against the inner wall of the shell and the outer wall of the duct so that air can be better filtered and condensed.

1 Claim, 2 Drawing Sheets

AIR DRIER

BACKGROUND OF THE INVENTION

The present invention relates to an improved air drier which is used to make humid and filthy air dried and cleaned by way of an air condenser and a cylinder shaped shell having a duct disposed therein which is provided with an air outlet tube for the cleaned and dried air to be discharged therefrom. The outer wall of the duct is provided with a continuous partition board attached thereto in a helix manner with the elongated condensing tube of a condenser disposed helically along the outer wall and in conformance to the helical partition board so that humid and dirty air pumped into the cylinder shaped shell and whirlingly led through the space defined by the helically wound partition board at a fast speed are in collision against the walls of the duct and the shell, resulting in the moisture particles and the dirt particles of the air filtered out and the condensed water dripping down along the walls thereof and collected at the conical bottom of the shell.

As shown in FIG. 1, a conventional air drier is used to make humid air dried by condensing the moisture particles therein by way of a coolant 11 which circulates in a looped tube 12. The coolant 11 is compressed by a compressor 13 and is led through a condenser 14 and to a coolant drying unit 15 and further to a thermal exchanger 18 and finally returns to the compressor 13. A fan 17 is used to cool off the coolant 11 and the pressure of the coolant is controlled by a pressure control valve 16. As humid air enters the thermal exchanger 18 by way of an air inlet port 181, the moisture particles contained therein are condensed into water via the coolant 11. The water and the air with some dirt particles are discharged via an outlet port 182 disposed at the top of the thermal exchanger 18 with water discharged via a water discharging unit 19. The problem is that the dust or dirt particles are easily mixed with the dried air and discharged into the surroundings.

SUMMARY OF THE INVENTION

Therefore, the primary object of the present invention is to provide an improved air drier which is able to separate both moisture particles and dirt particles from the condensed air so as to effectively filter and clean humid air led therethrough.

Another object of the present invention is to provide an improved air drier which is provided with a cylinder shaped shell having a conical water collecting bottom and is provided with a duct in the middle thereof which is equipped with an air outlet tube therein and a helically disposed continuous partition board and an elongated condensing tube wound in conformance to the helical partition board so that the air pumped into the air drier is whirlingly led therethrough, resulting in the moisture and dirt particles in collision with the inner wall of the shell and outer wall of the duct so as to separate the particles from the air and make the dried air effectively filtered and cleaned.

DETAILED DESCRIPTION OF THE PREFERRED EMBODIMENT

Figure 1:
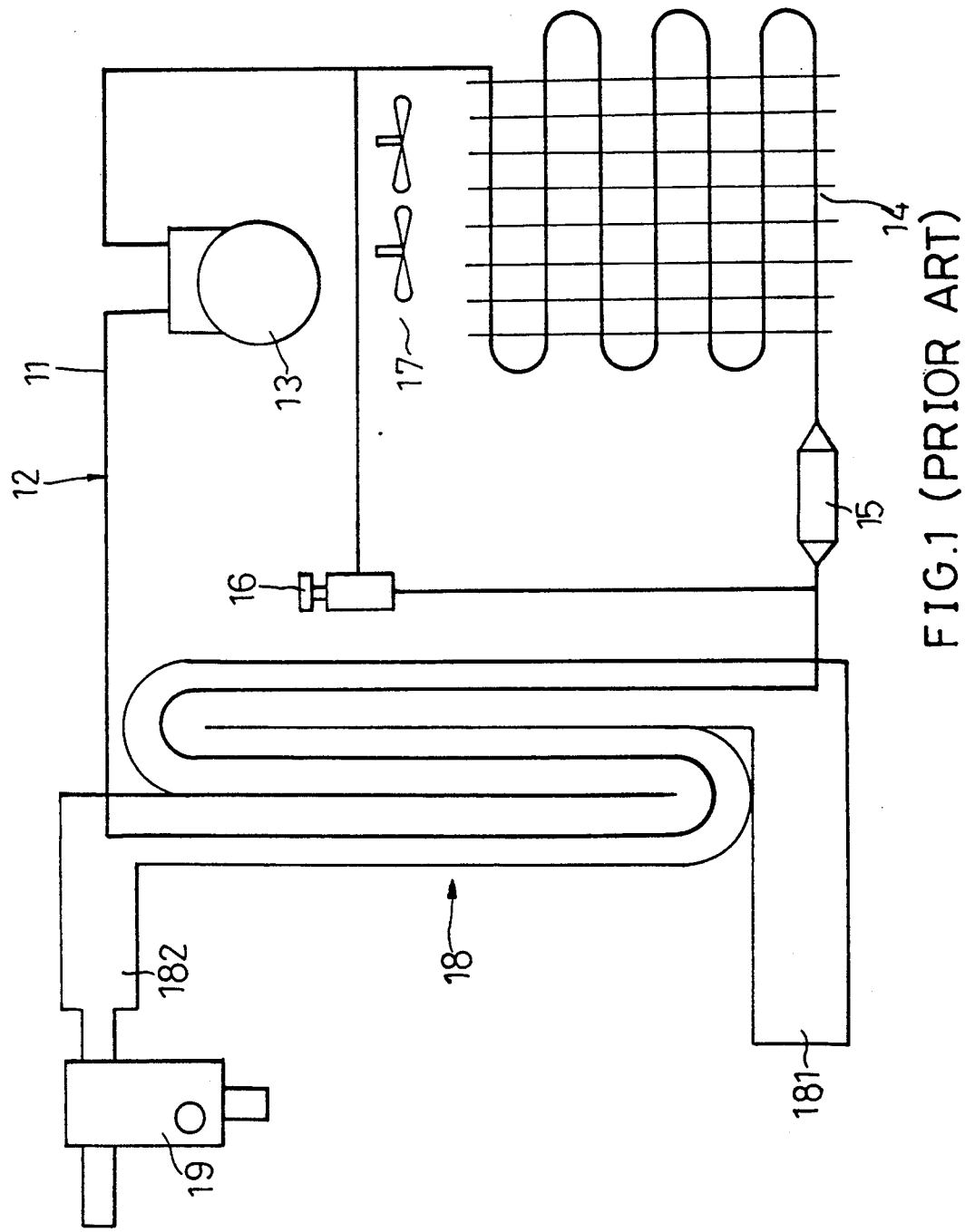
FIG. 1 is a diagram showing a prior art air drier.
Figure 2:
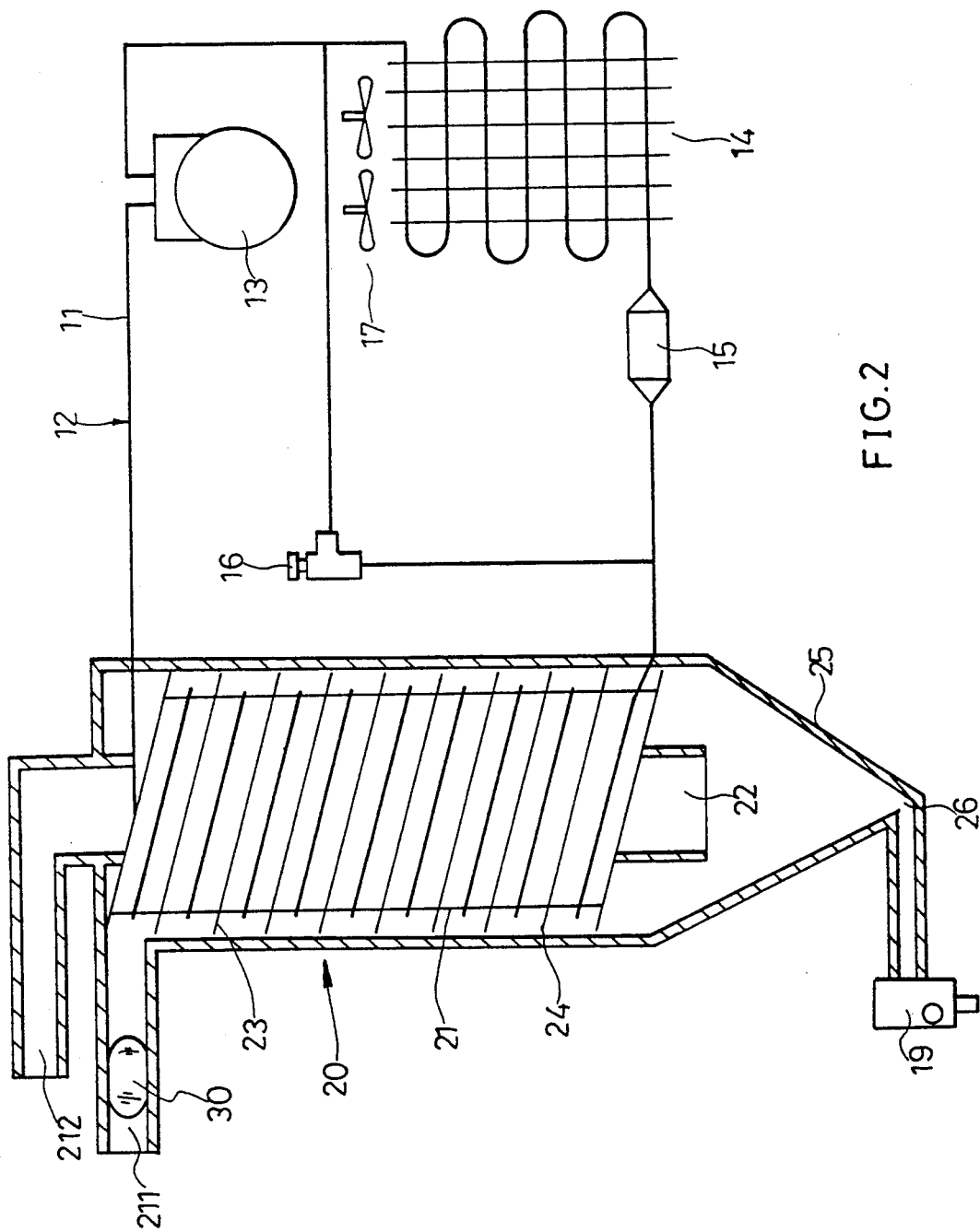
FIG. 2 is a diagram showing an air drier of the present invention.

Referring to FIG. 2, the present air drier is structured in a similar way as the prior art air drier in which coolant 11 is confined and circulates in a closed condensing tube 12; the coolant compressed by a compressor 13 is led through a condenser 14 and a coolant dring unit 15; and a blow fan 17 is used to cool off the coolant and a pressure control valve 16 works to regulate the pressure of the coolant 11.

The air drier of the present invention is distinguishingly characterized in that the coolant 11 is led by the condensing tube 12 into a cylinder shaped shell 20 which is equipped with a conical water collecting bottom 25. Inside the shell 20 is disposed a duct 21 on the outer wall of which is equipped with a helically disposed continuous partition board 23 with the condensing tube 12 helically positioned in correspondence to the helical partition board 23. The partition board 23 is separated from the inner wall of the shell 20 by a drain space 24 so that water drops can be drained therefrom to the conical water collecting bottm.

An air outlet tube 22 having one end disposed in the conical water collecting bottom is disposed in the duct 21 for discharging the dried air from the shell into the surrounding via an outlet port 212. In operation, humid air is introduced into the cylinder shaped shell 20 via an inlet port 211 in communtion with the space formed by the continuous partition board and is further pumped by an air pump 30. The pumped air is forced into the space formed by the helically disposed continuous partition board 23 whereby the air whirlingly travels down toward the conical bottom 25. During the journey, the moisture particles and the dirt particles contained therein are constantly in collision with the inner wall of the shell 20 and the outer wall of the duct 21 as a result of the exertion of a centrifugal force and will be effectively filtered accordingly. The so condensed water drops will drip down along the surfaces of the shell 20 and the partition board 23 into the conical water collecting bottom 25 of the shell 20. A water draining device 19 is disposed at the water collecting bottom 25 for discharging the collected water outward.

It is apparent to see that the so processed humid air is able to be effectively and cleanly filtered by way of the helical structure of the continuous partition board, and the air with the moisture and dirt particles removed is delivered to the surrounding by way of the air outlet tube 22 thereby in a closed area fresh and cleaned air is able to be produced with ease.

I claim:

1. An improved air drier which is equipped with a closed condensing tube with coolant circulating therein; said coolant being compressed by a compresser and delivered to a condenser and flowing through a coolant drying unit and cooled off by way of fan means and a pressure control valve being used to regulate the pressure of said coolant; and said air drier being characterized in that a cylinder shaped shell having a conical water collecting bottom is provided with a duct therein, on the outer wall of which is disposed a helically positioned continuous partition board with said condensing tube helically wound thereto in correspondence to said helically disposed partition board; and an air outlet tube is disposed in said duct for discharging dried air therethrough having one end disposed in said conical water collecting bottom; the periphery of said partition board being out of contact with the inner wall of said shell with a drain space left therebetween so as to permit water drops condensed from moisture particles in said humid air to be drained therefrom; said shell being provided with an air inlet port in communication with the space defined by said helically disposed partition board with an air pump disposed at said air inlet port whereby said humid air can be forcedly pumped into said space formed by said helically disposed partition board and whirlingly travels downward wherein moisture particles and dirt particles are in constant collision with the inner wall of said shell and the outer wall of said duct as a result of the exertion of the centrufugal force applied thereto due to the moving in said helical space so as to better filter said humid air by removing the moisture and dirt particles contained therein.

* * * * *